United States Patent
Malkan

(10) Patent No.: US 12,153,231 B2
(45) Date of Patent: *Nov. 26, 2024

(54) SHEER MATERIAL FOR USE IN ARCHITECTURAL COVERINGS

(71) Applicant: Hunter Douglas Inc., New York, NY (US)

(72) Inventor: Sanjiv R. Malkan, Broomfield, CO (US)

(73) Assignee: Hunter Douglas Inc., New York, NY (US)

( * ) Notice: Subject to any disclaimer, the term of this patent is extended or adjusted under 35 U.S.C. 154(b) by 310 days.

This patent is subject to a terminal disclaimer.

(21) Appl. No.: 17/570,595

(22) Filed: Jan. 7, 2022

(65) Prior Publication Data

US 2022/0128743 A1 Apr. 28, 2022

Related U.S. Application Data

(63) Continuation of application No. 16/398,875, filed on Apr. 30, 2019, now Pat. No. 11,243,337.

(Continued)

(51) Int. Cl.
*G02B 5/02* (2006.01)
*E06B 9/42* (2006.01)
*F21V 8/00* (2006.01)

(52) U.S. Cl.
CPC ............ *G02B 5/0268* (2013.01); *E06B 9/42* (2013.01); *G02B 5/0221* (2013.01); *G02B 6/0051* (2013.01)

(58) Field of Classification Search
CPC .. G02B 5/0268; G02B 6/0051; G02B 5/0221; G11C 29/83; G11C 29/789; A01G 13/0268; A01G 13/0275; A01G 13/10; E06B 9/34; E06B 9/42; E06B 9/266; E06B 9/386; D01F 1/106; D04B 21/10; D10B 2503/03; D03D 19/00

See application file for complete search history.

(56) References Cited

U.S. PATENT DOCUMENTS 4,469,738 A 9/1984 Himelreich, Jr.
4,530,113 A 7/1985 Matterson
(Continued)

FOREIGN PATENT DOCUMENTS

CN 106048777 10/2016
GB 716605 10/1954
WO WO 2008/053116 5/2008

*Primary Examiner* — Mustak Choudhury
(74) *Attorney, Agent, or Firm* — Dority & Manning, P.A.

(57) ABSTRACT

The present disclosure is generally directed to a covering for architectural features, which may include windows, doorways, archways, and the like, where the covering includes a panel made from a light diffusing material. The light diffusing material is designed and engineered to allow a significant amount of light to pass through the material for providing a desired visual effect while having improved dimensional stability. The covering may contain a light diffusing material that extends along a first direction of the covering (e.g., vertically). The light diffusing material may have an openness factor of about 60% or greater and contain pillars extending in the first direction and bridges extending between the pillars. Each pillar may contain at least two yarns, and each bridge may contain at least one yarn.

20 Claims, 9 Drawing Sheets

Related U.S. Application Data

(60) Provisional application No. 62/665,886, filed on May 2, 2018.

(56) References Cited

U.S. PATENT DOCUMENTS

| | | | |
|---|---|---|---|
| 5,313,999 | A | 5/1994 | Colson et al. |
| 5,419,385 | A | 5/1995 | Vogel et al. |
| 5,664,613 | A * | 9/1997 | Jelic ........................ E06B 9/262 |
| | | | 160/84.05 |
| 5,965,467 | A * | 10/1999 | Stevenson ........... E02D 29/0225 |
| | | | 405/129.75 |
| 8,828,894 | B2 | 9/2014 | Newton |
| 2003/0181110 | A1 * | 9/2003 | Bouvant ................ D04B 21/10 |
| | | | 442/1 |
| 2003/0186606 | A1 * | 10/2003 | Sutherland ........... D03D 13/008 |
| | | | 139/416 |
| 2003/0205339 | A1 | 11/2003 | Colson et al. |
| 2006/0180278 | A1 | 8/2006 | Colson et al. |
| 2011/0120661 | A1 | 5/2011 | Kim |
| 2013/0163062 | A1 | 6/2013 | Yang et al. |
| 2015/0059239 | A1 | 3/2015 | Andersson et al. |
| 2015/0223411 | A1 * | 8/2015 | Toye ...................... D03D 1/007 |
| | | | 442/50 |
| 2018/0216285 | A1 * | 8/2018 | Pratt ..................... D06M 17/04 |
| 2018/0216287 | A1 | 8/2018 | Weisman et al. |

\* cited by examiner

SHEER MATERIAL FOR USE IN ARCHITECTURAL COVERINGS

RELATED APPLICATION

The present application is a continuation of U.S. Patent Application Ser. No. 16/398,875, filed on Apr. 30, 2019, which is based on and claims priority to U.S. Provisional Patent application Ser. No. 62/665,886, filed on May 2, 2018, both of which are incorporated herein by reference.

FIELD

The present subject matter relates generally to sheer materials, and, in exemplary embodiments, sheer materials for use in architectural coverings.

BACKGROUND

Various different coverings exist for architectural features or openings, which may include windows, doorways, archways, and the like. The coverings, for instance, can provide privacy, can block views from the outside, can provide thermal insulation, and/or can be aesthetically pleasing. Coverings for architectural features can take many forms and can include a fabric or other material that is designed to be suspended adjacent to an architectural feature by operating mechanisms that may be capable of extending and retracting the fabric or material.

Coverings for architectural features, for instance, can be configured to be extended and retracted in numerous ways. In one embodiment, for instance, the covering can include a rotatable roller that winds and unwinds material for retracting and extending the covering (e.g., about or from the roller, respectively). Other coverings include stacking type coverings in which the bottom of the covering is brought closer to the top of the covering to retract or open the covering from an extended or closed position or configuration. For instance, Roman shades hang substantially flat when lowered and include battens or other stiffening elements which cause the covering fabric to gather in generally uniform folds when the covering is retracted. Still another type of covering is referred to as a cellular shade. Cellular shades are made from a series of cells which generally collapse or fold into stacks when the covering is retracted.

One type of distinctive covering for architectural features is sold under the brand name Silhouette® by Hunter Douglas, which is described in U.S. Pat. No. 5,313,999, and which is incorporated herein by reference in its entirety. Such coverings, for instance, can include generally vertical front and back sheets that support generally horizontal vane elements. The vertical sheets (often referenced herein as support sheets) are typically made from materials that allow a substantial amount of light to pass through the covering. Such materials are typically referred to as "sheer" materials which can be made with a relatively open weave. The vertical support sheets together with the substantially horizontal vanes form a flexible or soft-light controlling window covering or panel. The materials used to form the covering can be flexible in nature, allowing for the covering to be operated by rolling and unrolling the shade about a roller. Various other shades are known which also include sheer materials designed to allow a substantial amount of light to pass through the material for providing a visual appeal.

Although various sheer materials have been used in the past to produce coverings for architectural features, such materials can have a tendency to be dimensionally unstable, especially under load. Furthermore, increasing the openness of past materials generally reduces the dimensional stability. Thus, a need currently exists for a light diffusing covering for an architectural feature that not only allows a significant amount of light transmission but also has dimensional stability, especially when being retracted and extended within an architectural feature.

SUMMARY

The present disclosure is generally directed to a covering for architectural features, which may include windows, doorways, archways, and the like, where the covering includes a panel made from a light diffusing material. The light diffusing material is designed and engineered to allow a significant amount of light to pass through the material for providing a desired visual effect while having improved dimensional stability.

The covering may contain a light diffusing material that extends along a first direction of the covering (e.g., vertically). The light diffusing material has an openness factor of about 60% or greater. The material displays a generally grid-like pattern defined by columns and rows. Each column is comprised of contiguous pillars extending in the first direction and each row is comprised of contiguous bridges extending between the pillars. Each pillar may contain at least two yarns, and each bridge may contain at least one yarn.

Various different types of coverings can incorporate the light diffusing material as described above. In one embodiment, for instance, the covering can include a roller that is engaged with the light diffusing material. The roller can be configured to rotate for winding and unwinding the light diffusing material (e.g., about the roller) thereby causing the material to retract and extend.

In one embodiment, the covering includes a front support member having a height in a first direction and a width in a second direction and a rear support member having a height in the first direction and a width in the second direction. A plurality of generally horizontal vanes extend between the front and rear support members and can be configured for angular orientation. In accordance with the present disclosure, the front support member, the rear support member, or both the front support member and the rear support member can be made from a light diffusing material of the present disclosure as described above. Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
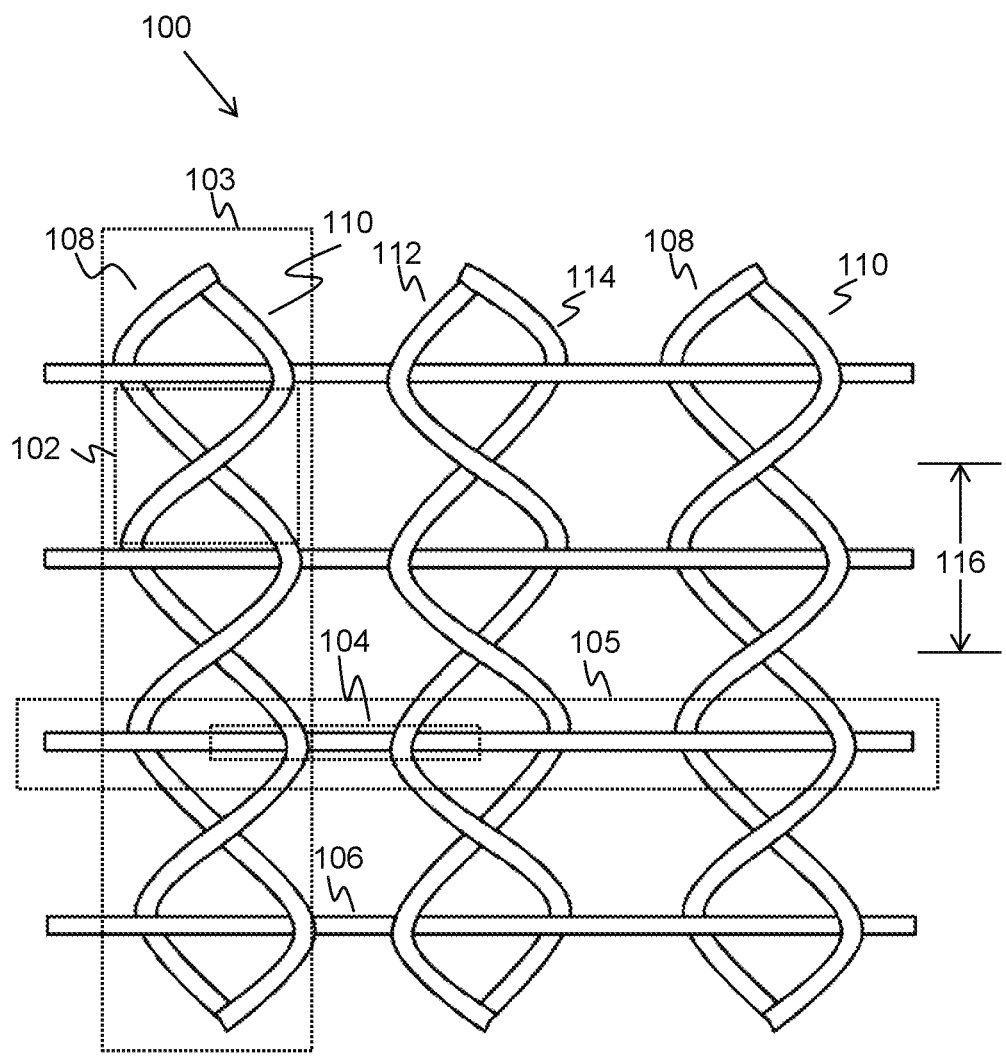
FIG. 1 shows a schematic of one example of an embodiment of a fabric pattern according to the present invention.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to coverings for architectural features which include, for example, windows, doorframes, archways, and the like. The coverings are particularly useful for windows to provide an aesthetic look and desirable shading and privacy. In accordance with the present disclosure, the coverings generally include a light diffusing material. The light diffusing material is constructed so as to have improved openness while possessing high dimensional stability. For instance, the material is well suited for maintaining its shape under loads, such as dynamic loads (e.g., from a user operating the covering) and static loads (e.g., from the weight of the covering). In one embodiment, the light diffusing material is constructed to allow a significant amount of light to pass through the material while still providing a distinctive, unique, and/or appealing effect. As will be explained in greater detail below, the light diffusing material can be used in all different types of coverings for architectural features.

Of particular advantage, when the light-diffusing material is configured to form a grid-like pattern defined by columns and rows of yarns, wherein the columns contain contiguous pillars and the rows contain contiguous bridges, the pillars may contain a plurality of yarns to increase strength and/or tensile stiffness in the pillar direction. In some embodiments, the pillars are aligned in a first direction (e.g., vertically) and the bridges are aligned in a second and perpendicular direction (e.g., horizontally). In some embodiments, the bridges contain a different number of yarns or different types of yarns than the pillars to decrease the overall weight of the covering and/or to provide a desired tensile stiffness ratio between the first direction and the second direction. In some advantageous embodiments, some of the bridge yarns are not perpendicular to the pillar yarns and form truss-like structures between each pillar. The truss-like structures may, in some embodiments, permit a load on any one pillar to be more uniformly distributed throughout the light diffusing material. In this manner, both the tensile stiffness and the dimensional stability of the light diffusing material may be improved.

Also of advantage, some embodiments include pillar yarns forming a twisted pair; for example, two pillar yarns may form a double helix. In this manner, the bridges may be securely captured between the pillar yarns to increase the tensile stiffness and dimensional stability of the light diffusing fabric by minimizing slip at the intersections of the pillars and the bridges. A mechanical joint may be formed without complex knots, knit patterns, or other structures which may contribute to stress risers within the material. In some embodiments, the helical pair enhances the torsional stability of the material. In some cases, the direction of the helical pair may be alternated from pillar to pillar to exploit the internal bias of the fabric for greater stability.

As used herein, "light diffusing" is not limited to a light barrier which scatters all incident light. For example, "light diffusing" may include the diffusing of only some light, or even the blocking of some light. In some examples, a light diffusing material may diffuse incoming light and pass a soft glow of variable intensity from one side of the material to the next. In other examples, the light diffusing material may provide a screen effect, blocking some light without significantly distorting or diffusing the light.

The amount of light blocked or diffused may be characterized by the openness factor of a material which measures the percent of open space in, for instance, a material, where a 60% openness factor has 40% material and 60% holes or open spaces. The higher the openness factor, the more sheer and greater transparency is provided by the material. One manner of measuring openness factor is to measure the area of the yarns and/or open areas and calculate the percentage of area that has no material. In one example, a digital microscope or high resolution camera may be used to capture an image of the material and the image used to calculate the percentage that does not have fabric, yarns, or material. A Motic digital microscope and Motic Image Plus 2.0 Software may be used to measure the openness factor of various materials. In one embodiment, the light diffusing material has an openness factor of about 60% or greater, and about 95% or less including all increments of about 0.01% therebetween.

Increasing the openness factor of a material typically requires thinning or otherwise reducing the internal structure of the material. Advantageously, the openness factor of a light diffusing material according to the present disclosure may be increased without compromising the dimensional stability of the material. Dimensional stability relates to the resistance of a material to a change in its shape. For example, a dimensionally stable material may generally maintain its shape while being subjected to loads, such as during processing or during use in an end application. When an architectural covering contains materials with good dimensional stability, the covering may retain its original or initial shape and form while being operated by a user; for instance, if a user extends a retractable covering by application of an uneven or excessive force to one portion of the covering, dimensionally stable materials would assist the covering in retaining its designed, e.g., initial or original, shape, despite the uneven or excessive force applied.

One aspect of dimensional stability may be characterized by the tensile stiffness of a material measured according to ASTM D5035. It is to be understood, however, that the tensile stiffness does not necessarily limit the flexibility (i.e., bending stiffness) of the material. To the contrary, some embodiments of the light diffusing material may exhibit both high tensile stiffness and high flexibility. If desired, however, a light diffusing material as described herein may be prepared with low flexibility. The selection of various material parameters will be explained in greater detail below.

Referring to FIG. 1, one exemplary embodiment of a light diffusing material 100 made in accordance with the present disclosure is shown. The material 100, as illustrated, is woven into a generally grid-like pattern defined by columns 103 and rows 105. Each column 103 is comprised of contiguous pillars 102 and each row 105 is comprised of contiguous bridges 104. In the embodiment shown, each bridge 104 contains only one yarn 106 and each pillar 102 contains two overlapping yarns, such as yarn 108 and yarn 110. Each bridge yarn 106 is mechanically joined to the double helix of the pillar yarns 108 and 110 as the bridge yarn 106 passes through a loop formed in the double helix. In some embodiments, the pillar yarns 108 and 110 extend the length of the light diffusing material 100, such as the length in a first direction.

When multiple helical formations are present, the direction of the twist of each helix may be independently selected, such as in an alternating pattern. For example, as shown in FIG. 1, the pillar yarns 108 and 110 are twisted in a first twist direction (e.g., clockwise) and pillar yarns 112 and 114 are twisted in a second twist direction (e.g., counterclockwise). Alternatively, each of the yarns of each of the pillars may twist in the same direction. Any other pattern of the direction of twist of each helix among the multiple helical formations may be used.

In one advantageous aspect, the twisting of the pillar yarns, e.g., yarns 108 and 110 or yarns 112 and 114, may lend congruity to the structure and appearance of the light diffusing material. For instance, the spacing between the bridge yarns 106 may be regulated by the compression forces exerted by the pillar yarns on the bridge yarns 106; the symmetric nature of each half-pitch helical unit 116 (i.e., one-half the pitch length of the helix) may assert a self-centering force on the bridge yarn 106 trapped therebetween. In this manner, uniform material properties may be enhanced.

Figure 2:
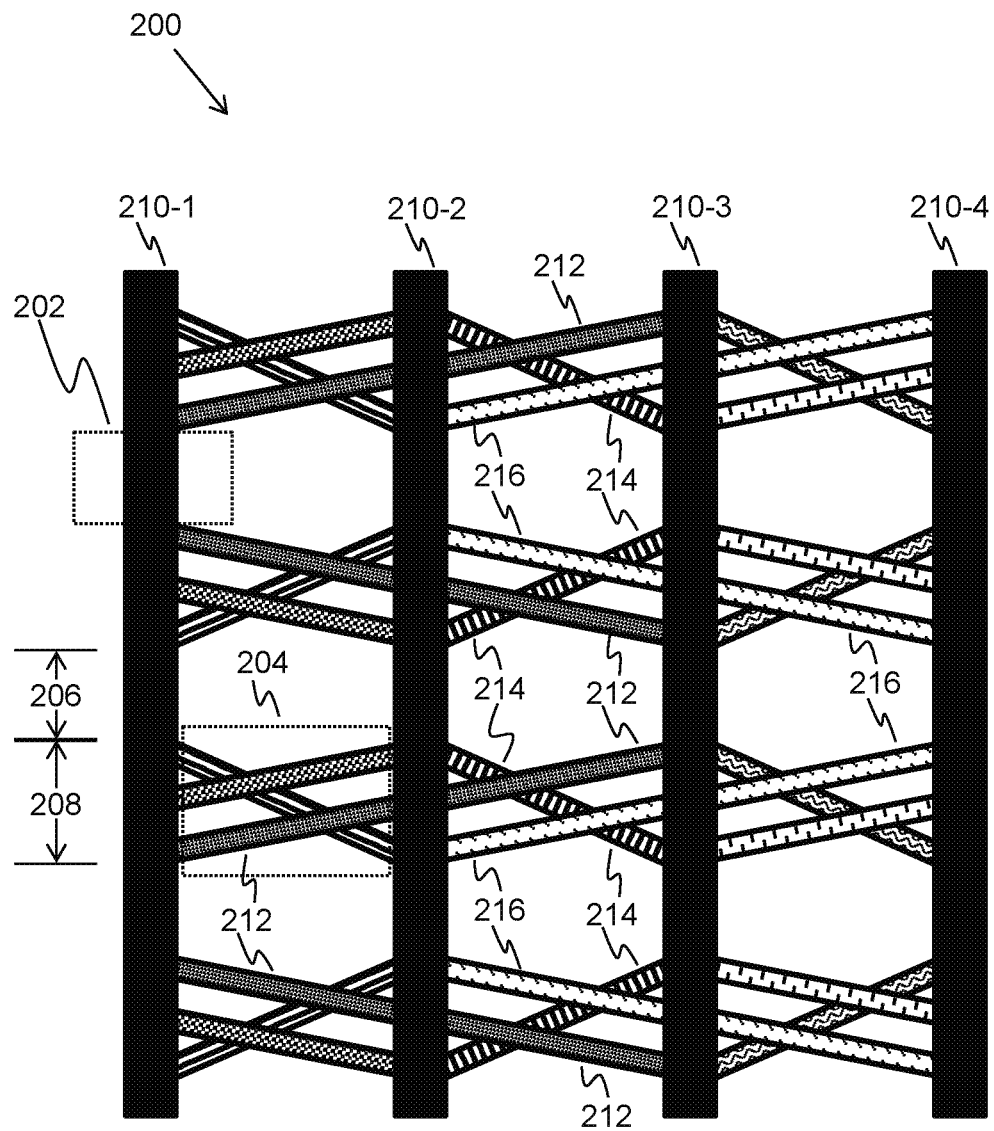
FIG. 2 shows a schematic of another example of an embodiment of a fabric pattern according to the present invention.
Figure 3:
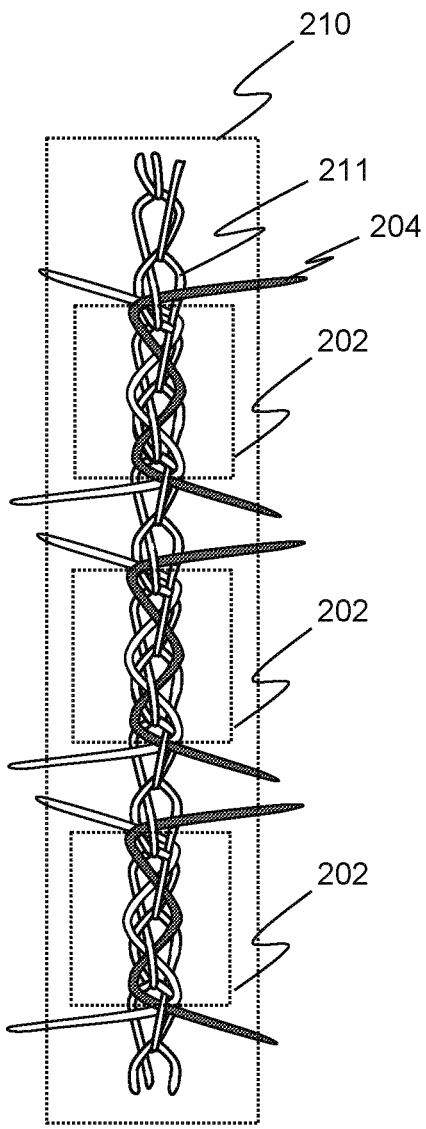
FIG. 3 shows an enlarged schematic of another example of an embodiment of a fabric pattern according to the present invention.

FIG. 2 illustrates another embodiment of the light diffusing material 200 of the present disclosure. Contiguous pillars 202 form within the columns 210-1, 210-2, 210-3, and 210-4 (generally, columns 210) which may span the length of the material 200. It is to be understood that the pillar 202 may contain one yarn, or any number of yarns, including twisted yarns, such as those shown in FIG. 1, and knit yarns, such as knit yarns forming intersecting and interlocking loops, such as shown in FIG. 3. For instance, in the example shown in FIG. 3, the pillars 202 may contain at least one yarn 211 which is present in every pillar 202 in a given column 210. In this manner, the pillar yarn 211 which extends the length of the column 210 may provide a continuous structure to which additional pillar yarns and/or the yarns within the bridges 204 may attach.

The bridges 204 may also be highly configurable. For example, the bridge spacing 206 (i.e., the distance between two bridges 204 in the pillar or vertical direction) may be adjusted independently from the bridge thickness 208 (i.e., the height difference in the pillar direction between the lowest bridge yarn and the highest bridge yarn of a bridge 204). For example, in one embodiment, when the bridge spacing 206 is small compared to the bridge thickness 208, such as by a multiple of about 0.01 to about 0.99, including all increments of 0.01 therebetween, the material 200 may have a generally mesh-like appearance without clearly distinct square or rectangular patterns. When the bridge spacing 206 is large compared to the bridge thickness 208, such as by a multiple of 1, 2, 3, 4, or more, or multiples at increments of 0.1 therebetween, the material 200 may have a more open appearance and define recognizable square or rectangular patterns.

Additionally, when the light diffusing material 200 contains a plurality of yarns in each bridge 204, one or more of the bridge yarns, such as all the bridge yarns, may wrap around or may otherwise be stitched or knitted into the pillars 202; in some embodiments, bridge yarns are stitched into yarns which run the length of a column 210. In this manner, the exact yarns present in contiguous pillars 202 may vary while still forming a grid-like structure with the columns 210 and the bridges 204.

For instance, in one embodiment, one bridge yarn 212 starts at the bottom of column 210-3, passes over or through column 210-2 and wraps around column 210-1 to form part of a truss-like structure between column 210-3 and column 210-1. The bridge yarn 212 wraps around column 210-1 across the length of one pillar 202, then returns over or through column 210-2, and wraps around column 210-3 across the length of one pillar 202 to repeat the pattern and form part of another truss-like structure between column 210-1 and column 210-3. Bridge yarns which span three adjacent columns, such as yarns 212 and 216, may overlap in coverage; for instance, both yarns 212 and 216 are present in between columns 210-2 and 210-3. In this manner, the support between columns 210 may be more integrally tied with each other. Another bridge yarn may only span between two adjacent columns; for example, one bridge yarn 214 starts at the bottom of column 210-2, wraps around column 210-3 across the length of one pillar, and returns to column 210-2 to repeat the pattern. As shown, the bridge yarn 214 is aligned crosswise to the other bridge yarns 212 and 216. In this manner, a truss-like structure is formed between each column 210 to enhance the tensile stiffness and dimensional stability of the light diffusing material 200; in some embodiments, such as the embodiment shown in FIG. 2, every bridge yarn is in an angled relationship with the adjacent columns (e.g., forming acute angles or obtuse angles such that no bridge yarn is perpendicular to an adjacent column). In other examples, some bridge yarns are angled with respect to the adjacent columns (e.g., forming acute angles) and some bridge yarns are perpendicular to the columns.

In one example, the bridge parameters, for instance, the bridge spacing 206 (which corresponds to the vertical length of the pillar 202) and the bridge thickness 208 may be adjusted to design a truss-like structure with the desired properties, such as tensile stiffness, flexibility, and appearance. Additionally, the dimensions of the bridge 204 may be selected in conjunction with the spacing between the columns 210 to obtain an optimal balance between strength, tensile stiffness, and appearance (i.e., openness). The number of yarns in each bridge 204 may similarly be varied; each bridge 204 may, for example, contain one, two, three, or more yarns. In one example, the spacing between the columns 210 may be approximately equal to the bridge spacing 206 to form generally square apertures within the material 200. When the spacing between the columns 210 is approximately equal to the bridge spacing 206, the material may demonstrate good dimensional stability in both the pillar and the bridge directions. However, in some examples, the pillars 202 are stiffer than the bridges 204; accordingly, the tensile stiffness of the material 200 in the bridge direction may be improved by increasing the number of rows per unit area, for example, by maintaining the bridge thickness 208 and decreasing the bridge spacing 206.

The dimensions of the grid-like pattern within the light diffusing material (100, 200) can depend upon various factors and the desired result, as described above. Each pillar (102, 202) can have a length of less than about 20 mm, and greater than about 1 mm, including all increments of 1 mm therebetween. Similarly, the length of each bridge (104, 204) is greater than about 1 mm, and less than about 20 mm, including all increments of 1 mm therebetween. The bridge spacing 206 and the bridge thickness 208 may, in some embodiments, be independently selected from lengths from greater than about 1 mm, and less than about 20 mm, including all increments of 1 mm therebetween. The relative proportions of the grid-like pattern may be expressed by different ratios. For example, the ratio of the bridge thickness to the bridge length may be selected from ratios greater than about 0.01, and less than about 20, including all increments of 0.1 therebetween. The ratio of the pillar length (i.e., bridge spacing 206) to the bridge length may be selected from ratios greater than about 0.1, and less than about 5, including all increments of 0.1 therebetween.

The light diffusing material can be made using various methods and techniques. In one embodiment, for instance, the light diffusing material is a fabric, such as a woven or knitted fabric as shown in FIG. 1 or FIG. 2. The light diffusing material can be constructed using various different weaving and knitting techniques. In one embodiment, the light diffusing material is a knitted fabric, such as a warp knitted fabric. For example, the knitted fabric shown in FIG. 2 and FIG. 3 may be warp-knitted with the pillars 202 aligned in the warp direction. For example, the light diffusing material can be warp knitted using a Tricot warp knitting machine or a Raschel warp knitting machine. The warp knitting machine used may be a 16 gauge, 20 gauge, 24 gauge, 28 gauge, or 32 gauge machine depending upon the size of the yarns being used and the desired openness factor. In one embodiment, the light diffusing material is a knitted fabric formed from a parallel series of warp yarns, such as to form parallel columns 210-1, 210-2, 210-3, and 210-4, as shown in FIG. 2. The warp yarns, for instance, can form a series of knitted loops, such as shown in FIG. 3. The series of knitted loops may be formed by a warp yarn, e.g., warp yarn 211, and may extend in the pillar direction, as shown in FIG. 3. Multiple yarns may be used so that a parallel series of knitted loops are formed. Each series of knitted loops alternately interlocks with adjacent series of knitted loops to form, in one example, a continuous column 210 of knitted loops formed in series as shown in FIG. 3.

In one embodiment, if desired, unknitted warp yarns also extend with the yarns which are formed into a series of knitted loops. The unknitted yarns, for instance, can be carried through the loops and interlock with the loops as the loops are successively formed in series. The unknitted yarns, for instance, can further reinforce the fabric by increasing the tensile stiffness in the warp direction. Through this process, a dimensionally stable fabric is produced that is well suited to absorbing stress, such as the forces to which coverings are normally exposed when covering an architectural feature.

In general, the light diffusing material is a fabric made from yarn, particularly synthetic yarns. The yarns, for instance, may comprise spun yarns, multifilament yarns, stretch broken yarns, monofilament yarns, or mixtures thereof. In one embodiment, the yarns can be made from polymers. Polymers that may be used to form the yarns include, for instance, polyester, nylon, polyolefins such as polypropylene or polyethylene, polyoxymethylene, and the like. For example, the pillar yarns and the bridge yarns may contain independently selected mixtures of yarn types. The types of yarns employed in the pillar and bridge directions may lend the light diffusing material directional tensile stiffness and/or flexibility properties. In one example, flexible first yarns are employed in the pillar direction to enhance drape of the material while less flexible second yarns are employed in the bridge direction to promote uniform shape in the bridge direction, such as while creasing, folding, or rolling.

The denier of the yarns may be selected in conjunction with the weaving or knitting pattern of the material to provide the desired openness and appearance of the light diffusing material while maintaining good dimensional stability. In one example, when the spacing of the pillars (102,202) and bridges (104, 204) is fixed, increasing the denier of the yarns may decrease the openness of the light diffusing material. Similarly, when the denier of the yarn is held constant, increasing the spacing of the pillars (102,202) and bridges (104, 204) will generally increase the openness of the material. Additionally, the denier of the yarns may be selected in view of the pillar and bridge dimensions to achieve a target flexibility (e.g., thicker yarns may generally result in a material with lower flexibility), basis weight (e.g., heavier yarns will increase the basis weight of a material for a given knitting or weaving pattern), tensile stiffness (e.g., heavier yarns may have greater tensile stiffness for a given yarn material), or processing characteristic (e.g., the weaving or knitting machine used may have certain yarn handling limitations, such as a maximum denier). The denier of the yarns, for instance, is about 10 denier or greater, and about 100 denier or less, including all increments of 1 denier therebetween.

In one embodiment, the light diffusing material is made from monofilament yarns. Some monofilament yarns may be selected to increase the abrasion resistance or bending stiffness of the material. In one embodiment, monofilament yarns are used in one direction of the light diffusing material to increase the resistance of the material to buckling. Additionally, or alternatively, in some embodiments, the yarns contain bi-component or conjugate yarns having a core-and-sheath structure. In one example, a material such as that shown in FIG. 1 contains conjugate yarns in the pillars 102, the bridges 104, or both. For instance, the core may contain one polymer selected for its strength and high melting point, and the sheath may contain another polymer selected for its adhesion properties and a lower melting point. For instance, the polymer contained within the sheath may have a melting point of about 180° C. or greater, and about 400° C. or less, including all increments of 1° C. therebetween. When the melting point of the sheath polymer is lower than that of the core polymer, the sheath may advantageously permit melt-fusing or melt-bonding of the fabric or light diffusing material via the sheath polymer while relying on the core polymer to maintain the shape and structural integrity of the fabric.

Any suitable thermal bonding process may be employed to fuse the material at crossover points, such as intersections between pillars (102, 104) and bridges (104, 204). For example, the material may be fed through heated calendar rolls to provide both the temperature and the applied pressure necessary to facilitate bonds between the yarns of the material. Another suitable process may include through-air heating.

Additionally, or alternatively, the yarns may be multifilament yarns; for example, a material such as that shown in FIG. 2 may employ multifilament yarns, as, in one aspect, multifilament yarns may generally have suitable flexibility for the stitching of the bridge yarns. Additionally, some multifilament yarns may be selected for a light diffusing material with increased flexibility in one or more directions. The number of filaments in each yarn may be selected to achieve the desired strength or tactile properties (e.g., softness, texture). For instance, filaments having a diameter of about 1 micron or greater, up to about 1000 microns or less, including all increments of about 1 micron therebetween, may be combined in any suitable number, such as 2 filaments or greater, and 36 filaments or less, including all increments of 1 filament therebetween, to form a single multifilament yarn.

The yarns used to form the light diffusing material can have any suitable color. In one embodiment, however, the yarns, such as the monofilament yarns, can be made with a dark color such as a black color or a grey color. Using darker colored yarns, for instance, may provide various advantages in some embodiments. For instance, dark colored yarns may increase visibility through the light diffusing material. Darker colors can also reduce glitter or glisten that may occur when bright light, such as sunshine, is transmitted through the material. Use of dark yarns may be advantageous for the additional reason that sunlight (i.e., UV rays) may not degrade the materials in the covering, and the materials may better retain their strength. In other embodiments, however, a lighter color may be desired. For instance, a lighter color may make the material less noticeable when hanging within a room.

The yarns used to form the light diffusing material can be provided with any desirable color using coloring agents, such as pigments, dyes, and the like. For instance, in one embodiment, the yarns can be solution dyed. For example, one or more coloring agents can be added to a molten polymer when making the fibers that are used to construct the yarns. In this manner, the coloring agent becomes dispersed and saturated throughout the yarn. The solution dying process generally works well for preparing single color yarn, which can be used to make long lasting exterior fabrics which are more resistant to ultraviolet light degradation. The embedded coloring agent or pigment may act to block UV rays and consequent UV degradation. When producing darker yarns, the coloring agent may be carbon black or other simple pigment. In addition to solution dyed yarns, the yarns can also be dyed using, for example, dispersion dyes after manufacturing the yarn. For example, the yarns can be dyed by printing with a dye using, for example, a roller prior to or after constructing the fabric. One or more sides of the fabric, for instance, can be printed.

The basis weight of the light diffusing material can vary depending upon the type of yarns, the size of yarns, and the arrangement of yarns (i.e., weaving or knitting pattern) used to make the material. For example, in some cases, the basis weight may be limited by the machines used in the processing and handling of the light diffusing material. Additionally, for a given weaving or knitting pattern, decreasing the basis weight may increase the openness and flexibility of the light diffusing material, as well as reduce the final weight of the end product incorporating the light diffusing material. However, in some cases, increasing the basis weight may convey desired strength, drape, and folding characteristics. In general, the basis weight of the light diffusing material is about 15 gsm or greater, and about 100 gsm or less, including all increments of 1 gsm therebetween, The light diffusing material of the present disclosure may be constructed with good dimensional stability as reflected by the tensile stiffness of the material. For example, the tensile stiffness of the material in the pillar direction (which may be the machine direction or warp direction in some examples) may be greater than about 1000 N/m, including all increments of 1 N/m thereafter, when measured at 0% elongation according to ASTM D5035. The tensile stiffness in the bridge direction (which may be the cross direction or weft direction in some examples) may be greater than about 1000 N/m, and less than about 5000 N/m, including all increments of 1 N/m therebetween, when measured at 0% elongation. The tensile stiffness in the pillar and in the bridge directions may be the same or different. The tensile stiffness at higher elongation percentages may remain generally constant or may change, depending on the yarn selection and fabrication process. For example, at higher elongation percentages, the tensile stiffness of the material in any direction may increase by multiples, such as by 1.5 times or greater, and about 5 times or less, including all multiples at increments of 0.1 therebetween. It is contemplated, however, that the maximum tensile stiffness may be even higher, such as 10, 20, 30, 40, or 50 times, or even higher multiples of the tensile stiffness at 0% elongation.

The dimensional stability may also be characterized by the load required to produce a measured amount of elongation, which is also measured by ASTM D5035. For example, a particular elongation threshold may be set at 2%. As the dimensional stability increases, the load required to elongate the material by at most about 2% may also increase; for example, the load required to elongate the material in one direction by about 2% may be greater than about 5 N, and less than about 20 N, including all increments of 1 N therebetween. Other elongation thresholds may be observed, depending on the desired application. For instance, the load required to elongate the material in one direction by about 5% may be greater than about 5 N, and less than about 30 N, including all increments of 1 N therebetween.

The light diffusing material can be incorporated into all different types of coverings for architectural features without limitation. For example, referring to FIG. 4, one example of a covering 300 made in accordance with the present disclosure is shown. The covering 300 includes a front support member 304 that is positioned parallel with a back support member 306. In between the front support member 304 and the back support member 306 are a plurality of movable vane elements 308. The vane elements 308, which are generally horizontal, can have a different light transmissivity or translucence than the support members 304 and 306. In this manner, the support members 304 and 306 in combination with the vane elements 308 control the amount of light that is transmitted through the covering 300. The shape and angular orientation of the vane elements 308 can be controlled by moving the support members 304 and 306 in parallel directions with respect to each other to further adjust the amount of light transmitted through the covering 300. For instance, the vane elements 308 can be rotated or pivoted between different angular orientations from generally perpendicular to parallel with respect to the support members 304 and 306 in order to control light, viewthrough, shading effect, privacy within a room, or any combination thereof. The covering 300 additionally includes a head rail 302. The entire assembly that makes up the covering 300 can be substantially flexible so that the front and back support members 304 and 306 and the vane elements 308 can be raised and lowered, such as by winding or retracting in to the head rail 302.

Additionally, an operating mechanism may be provided for facilitating raising and lowering of the covering 300. For example, in one embodiment, a roller is connected or associated with the front support member 304 and the back support member 306. The covering 300 can include a mechanism that rotates the roller for raising and lowering the front and back support members 304 and 306 in conjunction with the vane elements 308. The covering 300 can also include a bottom rail or weight 310 for providing further stability to the covering 300.

The operating mechanism for raising and lowering the front and back support members 304 and 306 can vary. In one embodiment, the mechanism can be connected to one or more operating cords 312. The one or more drawstrings 312 can be used to rotate the vane elements 308 and/or to raise or lower the front and back support members 304 and 306. In one embodiment, for instance, the cord 312 can be used to rotate the vane elements 308 and then raise the entire structure including the front and back support members 304 and 306 and the vane elements 308 onto a roller. In one embodiment, the front and back support members 304 and 306 can be coupled directly or indirectly to the roller at different horizontally extending locations along the circumference of the roller to provide lateral movement of the front and rear support members relative to each other. The horizontal extending vane elements 308 may be coupled to the front support member 304 along one edge and coupled to the back support member 306 along an opposite edge. In this manner, moving or shifting the front support member 304 in relation to the back support member 306 may cause an angular rotation of the vane elements 308.

Figure 4:
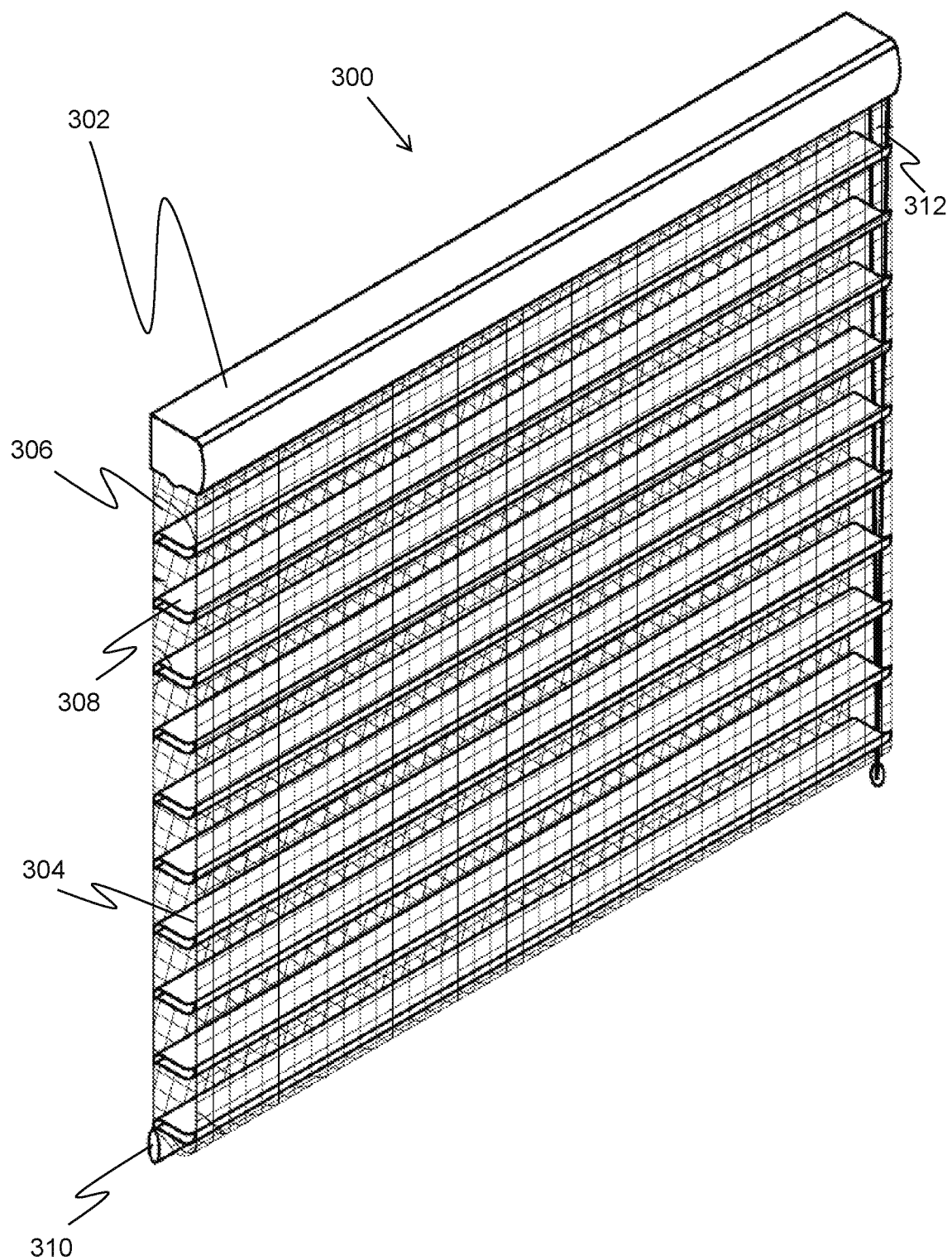
FIG. 4 shows a perspective view of one example of an embodiment of an architectural covering according to the present invention.
Figure 5:
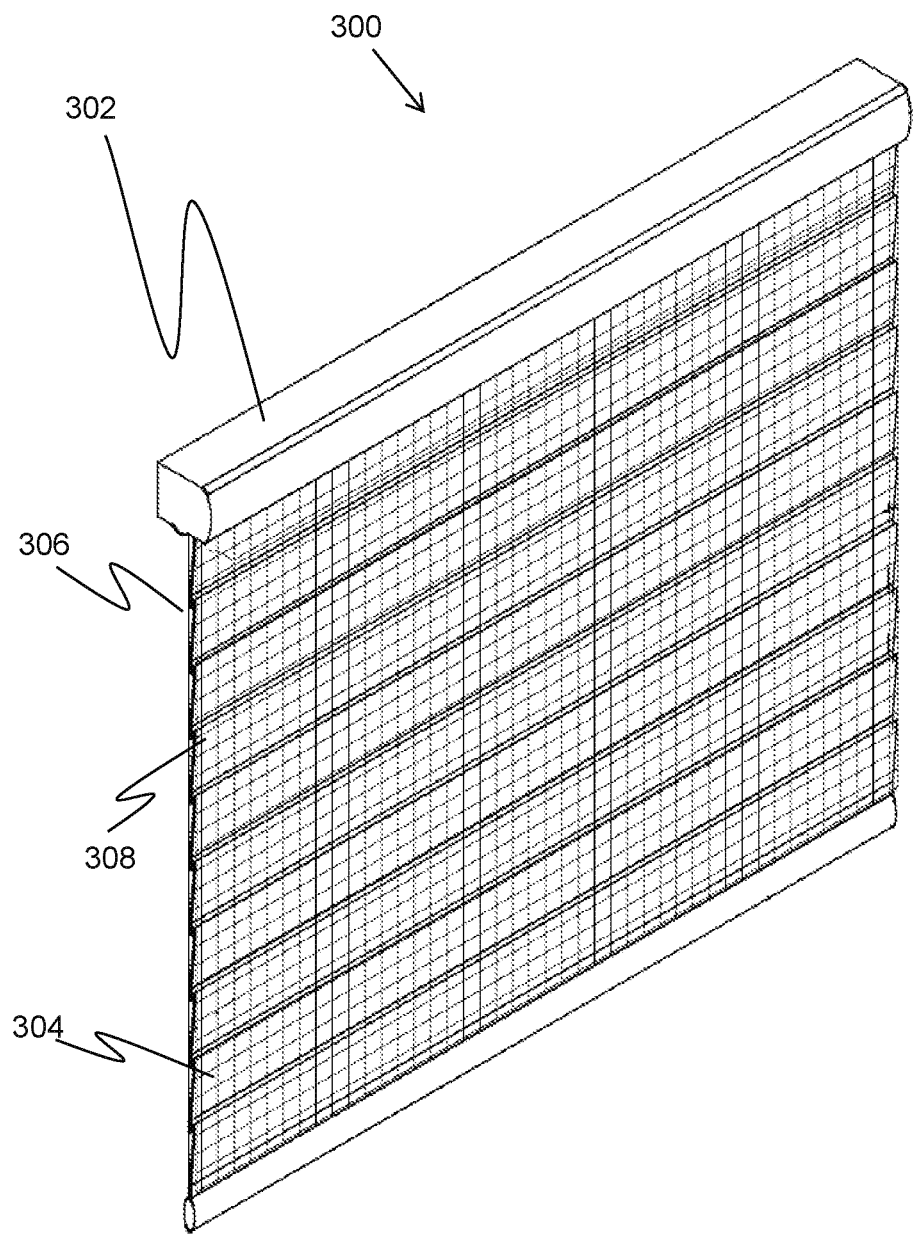
FIG. 5 shows a perspective view of one example of an embodiment of an architectural covering according to the present invention.

The vane elements 308 can rotate from an open position, as shown in FIG. 4, to a closed position, as shown in FIG. 5. In the open or horizontal position of the vane elements 308, as shown in FIG. 4, the maximum transmission of light through the covering 300 may occur. When the vane elements 308 are rotated to the closed or vertical position, as shown is FIG. 5, however, the minimum amount of light may be transmitted through the closed covering 300. The vane elements 308 can be rotated to any angular position between the open or horizontal position as shown in FIG. 4 and the closed or vertical position as shown in FIG. 5.

The vane elements 308 can be formed from various materials including strips, tapes, panels, and the like. Each vane element may be formed from a single piece of material or multiple pieces of material. The vane elements may be single layered or multilayered. In general, the vane elements 308 extend in a horizontal direction and each vane element 308 has a length that is greater than its width. The length of the vane elements 308 generally corresponds with the width of the covering 300. In one embodiment, the vane elements 308 are made from flexible, soft materials to form a generally flexible subassembly or panel for the covering 300. The horizontal vane elements 308 may also have varying light transmissivity properties, varying from blackout, opaque, partially opaque, translucent, transparent, or clear. In one embodiment as shown in FIG. 4, the vane elements 308 can include a hollow interior and form horizontal cells.

As shown in FIG. 4 and FIG. 5, the front support member 304 and the back support member 306 can be formed from sheer materials to provide a highly adjustable covering with a variety of light blocking and light diffusing configurations. In accordance with the present disclosure, the light diffusing material can be used to form the front support member 304 and/or the back support member 306. In one embodiment, both the front support member 304 and the back support member 306 are formed from light diffusing materials in accordance with the present disclosure. The light diffusing materials of the front support member 304 and the back support member 306, however, can be the same or can have different characteristics. For instance, the light diffusing materials can have a different openness factor and/or can be made from different colors. For example, in one embodiment, the back support member 306 can be formed from yarns having a dark color, while the front support member 304 can be made from yarns have a lighter color.

Figure 6:
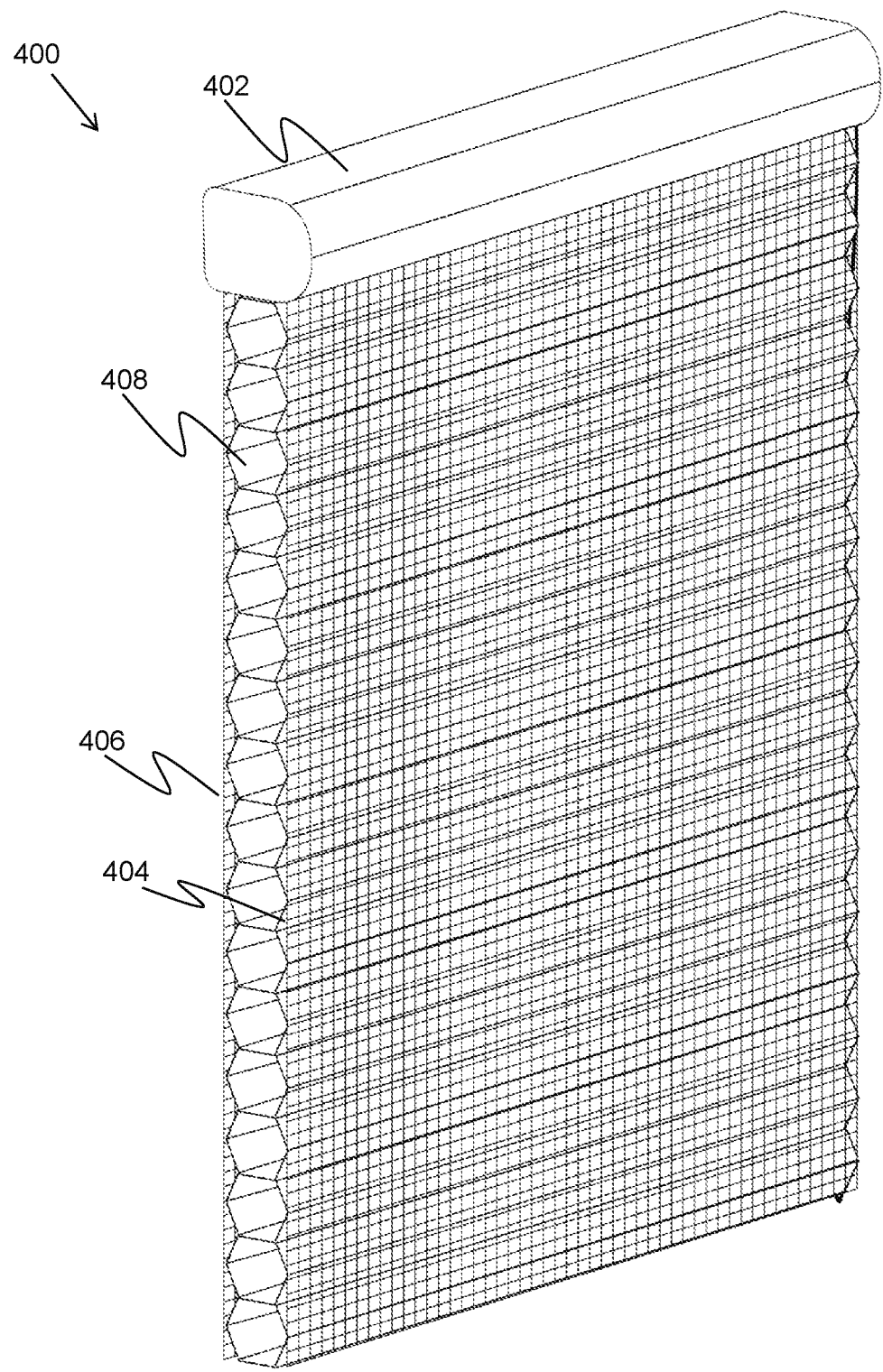
FIG. 6 shows a perspective view of another example of an embodiment of an architectural covering according to the present invention.

Another covering 400 is shown in FIG. 6 which provides honeycomb cells 408 horizontally arranged between a front sheer member 404 and a rear sheer member 406. In one embodiment, the front sheer member 404, rear sheer member 406, and honeycomb cells 408 may each be independently retracted toward the head rail 402 or extended away from the head rail 402. In other embodiments, at least one sheer member remains fixed in place while the honeycomb cells 408 may be adjustably positioned with respect to the head rail 402. In this manner, depending on which combination of the front sheer member 404, rear sheer member 406, and honeycomb cells 408 are overlapping in one position, incident light may be diffused and/or blocked differently to provide adjustable shading effects. Additionally, the amount of light diffused and/or blocked may vary across the length of the shade (i.e., the direction extending along the sheer members away from the head rail 402) depending on the relative positioning of the sheer members and the honeycomb cells 408. In another embodiment of a covering in accordance with the present disclosure, not shown, a covering may include honeycomb cells formed from light diffusing materials in accordance with the present disclosure, without a front sheer member or rear sheer member on either side of the honeycomb cells.

Figure 7:
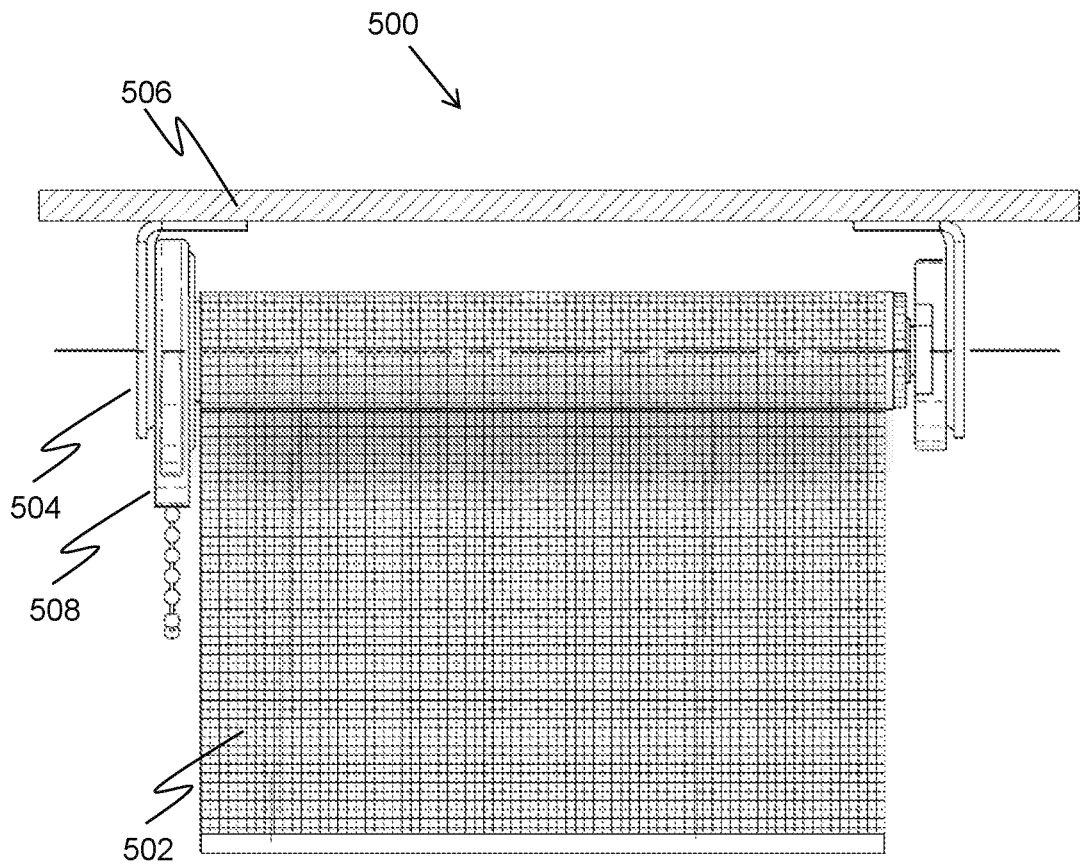
FIG. 7 shows a front elevational view of one example of an embodiment of an architectural covering according to the present invention.

Referring to FIG. 7, another embodiment of a covering 500 for an architectural feature in accordance with the present disclosure is shown. The covering 500 includes a vertical support member 502 made from the light diffusing material of the present disclosure. The vertical support member 502 is mounted onto a rotatable roller 504. The roller 504 is contained within a head rail 506 that includes a mechanism that rotates the roller 504 for causing the vertical support member 502 to raise and lower. For example, the mechanism can include a cord 508 that allows a user to rotate the roller 504. In the embodiment illustrated in FIG. 7, the covering 500 may be mounted adjacent to an architectural feature, such as a window.

In one embodiment, the vertical support member 502 of the covering 500 is made only from the light diffusing material of the present disclosure. Alternatively, the light diffusing material of the present discourse can be combined with other materials to form a laminate. For instance, the light diffusing material can be laminated to a woven fabric, a nonwoven fabric, or a combination thereof in order to control the amount of light transmission through the vertical member.

EXAMPLE

A sample light diffusing material was prepared according to the present invention to demonstrate the advantageous dimensional stability thereof. The light diffusing material was constructed with the pillar and bridge arrangement of FIG. 2, and the pillars contained warp knitted loops, such as those shown in FIG. 3. The yarns used to fabricate the light diffusing material were 40 denier multifilament yarns containing 24 filaments per yarn. The light diffusing material had an openness of 69.62% and a basis weight of 34 gsm. The apertures in the geometric grid were approximately square.

The dimensional stability of the light diffusing material example was evaluated by measurement of the elongation according to ASTM D5035.

In particular, ten 1 inch by 6 inch samples were cut from the material, five samples having the 6 inch length in the pillar direction, and five samples having the 6 inch length in the bridge direction. Each sample was placed on an Instron Model 4444 with a grip distance of 3 inches. Extension and tensile load measurements were recorded every 100.00 ms as the crosshead moved at a rate of 12.0 inch/min.

Figure 8:
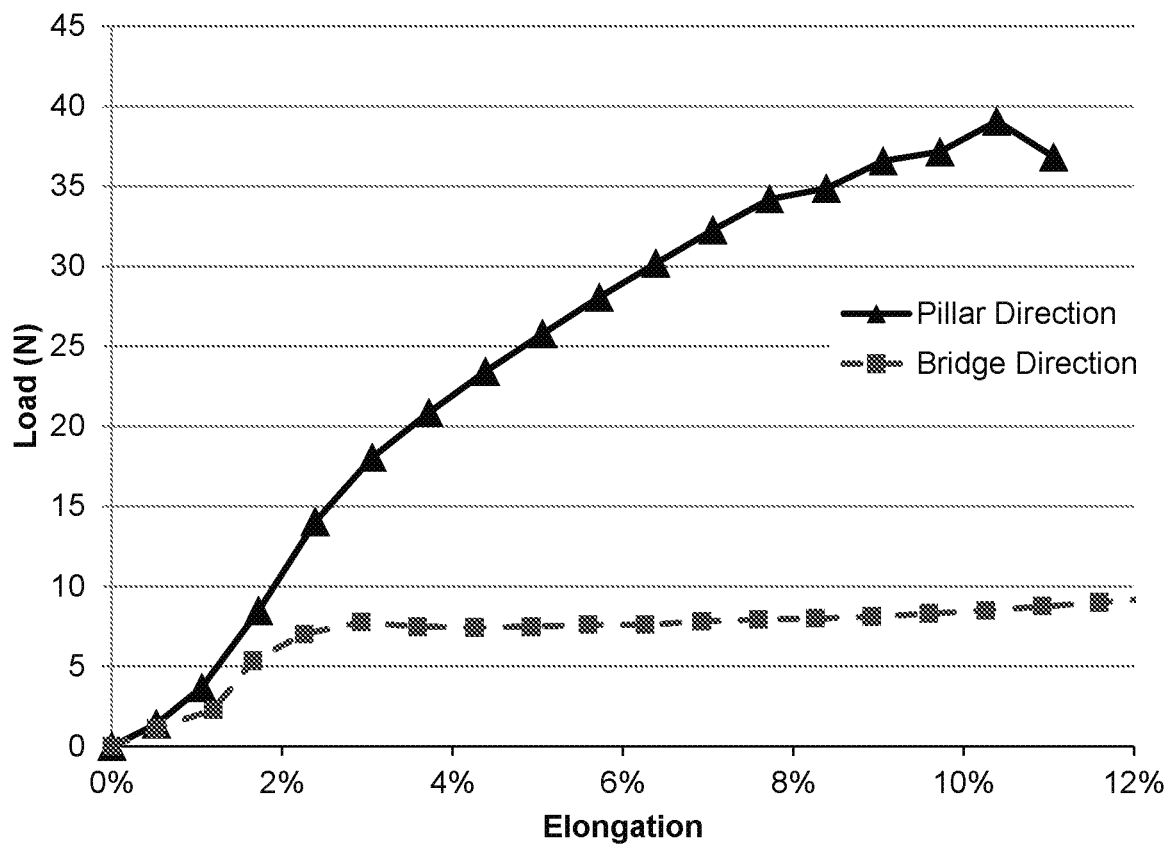
FIG. 8 shows a results plot for the load required to elongate a test sample of a material according to the present invention.
Figure 9:
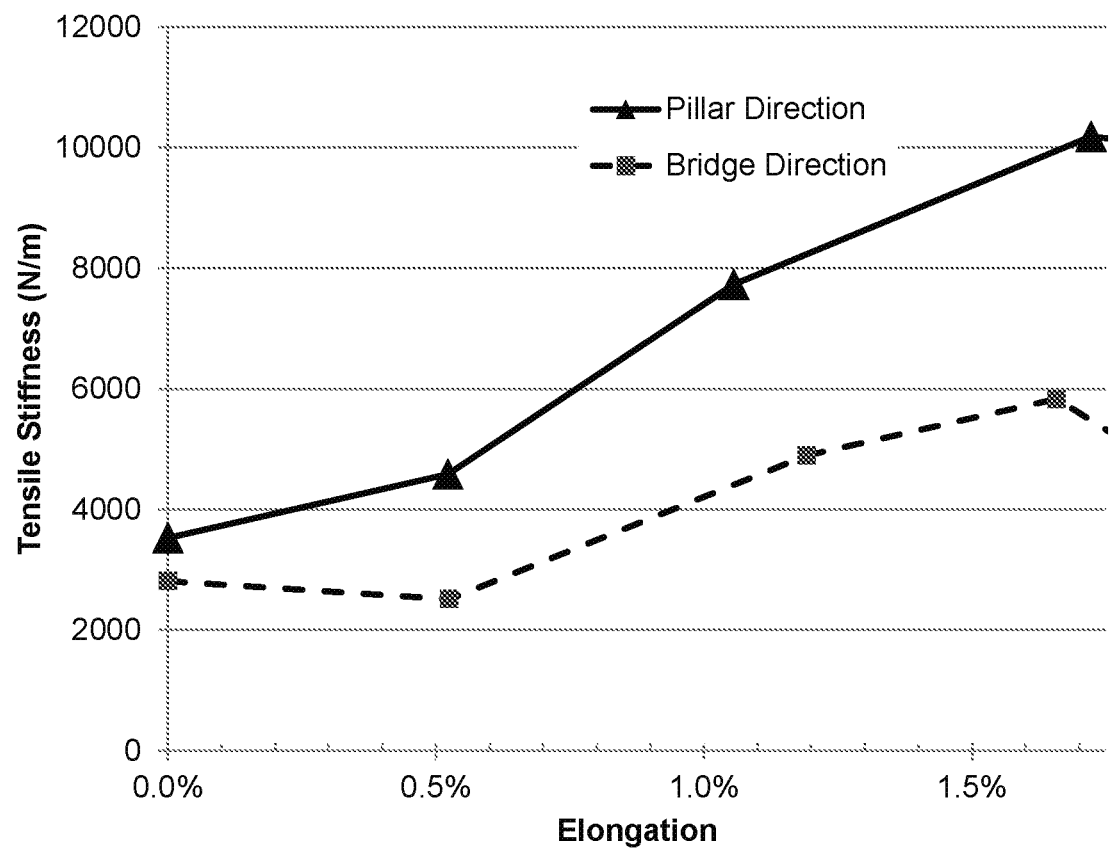
FIG. 9 shows a results plot for the directional tensile stiffness of a test sample of a material according to the present invention.

The measurements of the five samples in each direction were averaged together to produce the chart shown in FIG. 8. As can be seen, the loads withstood by the samples at low elongation were very similar in both the pillar and the bridge directions, although the ultimate strength of the material was much higher in the pillar direction. FIG. 9 charts the slope of the load-extension relationship as tensile stiffness. It is apparent that the tensile stiffness is similar in both the pillar and the bridge directions at low elongation, with good tensile stiffness in both directions even at 0% elongation.

The foregoing description has broad application. It should be appreciated that the concepts disclosed herein may apply to many types of architectural structure coverings, in addition to the coverings described and depicted herein. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

The phrases "at least one," "one or more," and "and/or," as used herein, are open-ended expressions that are both conjunctive and disjunctive in operation. The term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit. Additionally, although individual features may be included in different claims, these may possibly advantageously be combined, and the inclusion in different claims does not imply that a combination of features is not feasible and/or advantageous. Reference signs in the claims are provided merely as a clarifying example and shall not be construed as limiting the scope of the claims in any way.

What is claimed:

1. A covering for an architectural feature comprising a light diffusing material that extends along a first direction of the covering, the light diffusing material having an openness factor of 60% or greater, the light diffusing material comprising:
    pillars extending in the first direction, each pillar comprising at least two yarns; and
    bridges between the pillars, each bridge comprising at least one yarn,
    wherein at least one bridge yarn forms an acute angle with at least one pillar, and
    wherein at least one of the bridges comprises at least one bridge yarn that spans three adjacent pillars.

2. The covering of claim 1, wherein no bridge yarn is perpendicular to any of the pillars.

3. The covering of claim 1, wherein each bridge comprises at least two yarns.

4. The covering of claim 3, wherein each bridge comprises two parallel yarns.

5. The covering of claim 1, wherein each bridge comprises at least two yarns which cross each other between the pillars.

6. The covering of claim 1, wherein each pillar comprises at least three yarns.

7. The covering of claim 1, wherein each pillar comprises intersecting knitted loops of yarns.

8. The covering of claim 1, wherein a ratio of average spacing distance between adjacent bridges to average length of the bridges between pillars is 1.

9. The covering of claim 1, wherein each pillar comprises at least two yarns which extend the length of the light diffusing material in the first direction.

10. The covering of claim 1, wherein the yarns are monofilament or multifilament yarns.

11. The covering of claim 1, wherein the yarns have a denier of from at least 10 denier to at most 80 denier.

12. The covering of claim 1, wherein the light diffusing material has a basis weight of from at least 15 gsm to at most 100 gsm.

13. The covering of claim 1, wherein the yarns comprise bi-component filaments.

14. The covering of claim 1, wherein the yarns are thermally bonded together at crossover points.

15. The covering of claim 1, wherein the covering has a stiffness in the first direction or in a second direction that is greater than 1000 N/m at 0% elongation as measured by ASTM D5035.

16. The covering of claim 1, wherein a load of greater than 5 N is required to elongate the material in the first direction or the in a second direction by 2% as measured by ASTM D5035.

17. The covering of claim 1, wherein a load of greater than 20 N is required to elongate the material in the first direction or in a second direction by 5% as measured by ASTM D5035.

18. The covering of claim 1, wherein the covering includes a roller and wherein the light diffusing material is engaged with the roller and configured to retract and extend by winding and unwinding the roller.

19. The covering of claim 1, comprising:
    a front support member having a height in a first direction and a width in a second direction;
    a rear support member having a height in the first direction and a width in the second direction; and
    a plurality of vanes extending between the front and rear support members along the second direction, the vanes being configured to move at an angular orientation with respect to the front support member and the rear support member;
    wherein at least one of the front support member and the rear support member is formed from the light diffusing material.

20. The covering of claim 19, wherein the front support member is formed from the light diffusing material and wherein the rear support member is formed from a second light diffusing material.

* * * * *